(12) United States Patent
Schneider

(10) Patent No.: US 7,449,212 B2
(45) Date of Patent: Nov. 11, 2008

(54) SECURITY DOCUMENT

(75) Inventor: Walter Schneider, Miesbach (DE)

(73) Assignee: Giesecke & Devrient GmbH, Munich (DE)

( * ) Notice: Subject to any disclaimer, the term of this patent is extended or adjusted under 35 U.S.C. 154(b) by 601 days.

(21) Appl. No.: 10/511,628

(22) PCT Filed: Apr. 16, 2003

(86) PCT No.: PCT/EP03/04006

§ 371 (c)(1),
(2), (4) Date: Oct. 18, 2004

(87) PCT Pub. No.: WO03/089250

PCT Pub. Date: Oct. 30, 2003

(65) Prior Publication Data

US 2005/0181160 A1  Aug. 18, 2005

(30) Foreign Application Priority Data

Apr. 19, 2002  (DE) ............................... 102 17 632

(51) Int. Cl.
*B05D 5/06* (2006.01)

(52) U.S. Cl. ............................ 427/7; 427/336; 427/369; 427/547; 427/550; 427/553

(58) Field of Classification Search ................. 427/7, 427/336, 547, 550, 553, 355, 369
See application file for complete search history.

(56) References Cited

U.S. PATENT DOCUMENTS 4,143,103 A * 3/1979 Sheridon ..................... 264/4

FOREIGN PATENT DOCUMENTS

| EP | 0 721 176 A | 7/1996 |
| EP | 1 024 470 A | 8/2000 |
| WO | WO 00 36560 A | 6/2000 |
| WO | WO 01 04832 A | 1/2001 |
| WO | WO 01 88607 A | 11/2001 |

* cited by examiner

*Primary Examiner*—Kirsten C Jolley
(74) *Attorney, Agent, or Firm*—Rothwell, Figg, Ernst & Manbeck, P.C.

(57) ABSTRACT

A security document with a security element, wherein the security element includes at least partly a material that is optically changeable by an electric or magnetic field. In addition, a corresponding method for producing such a security document and a test method for testing such a security document are described.

6 Claims, 4 Drawing Sheets

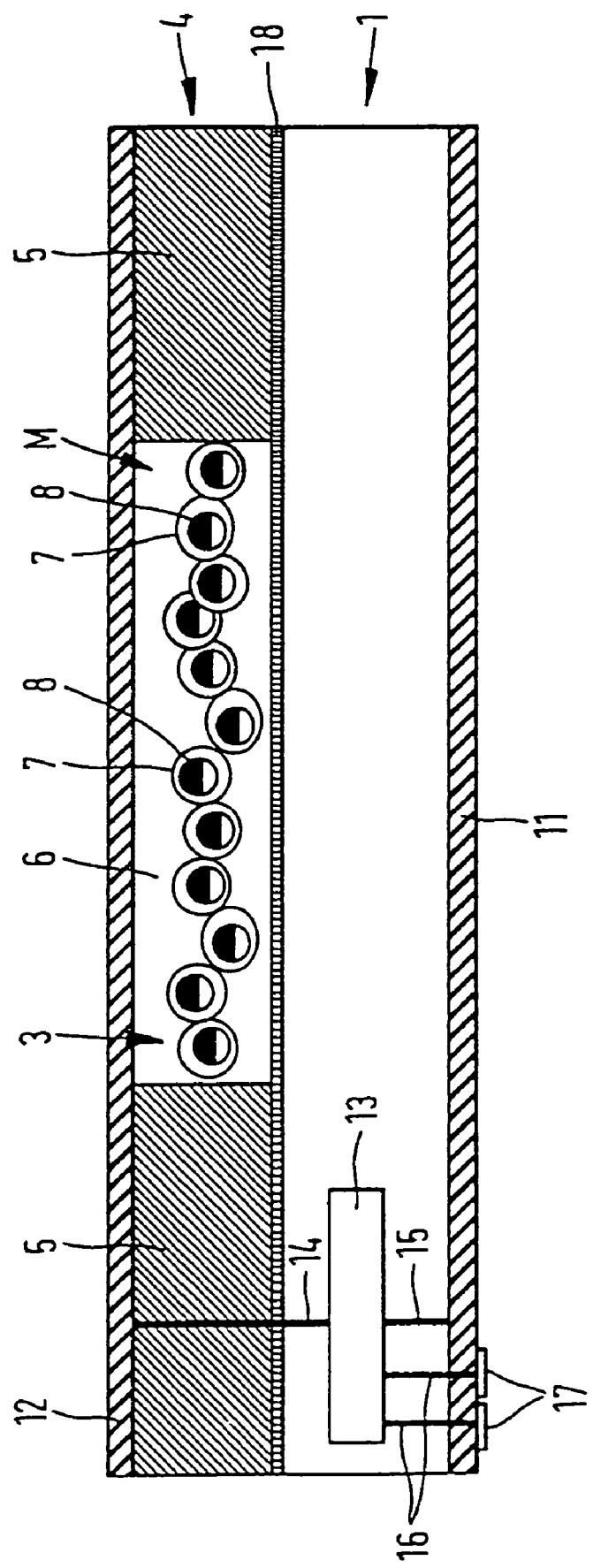

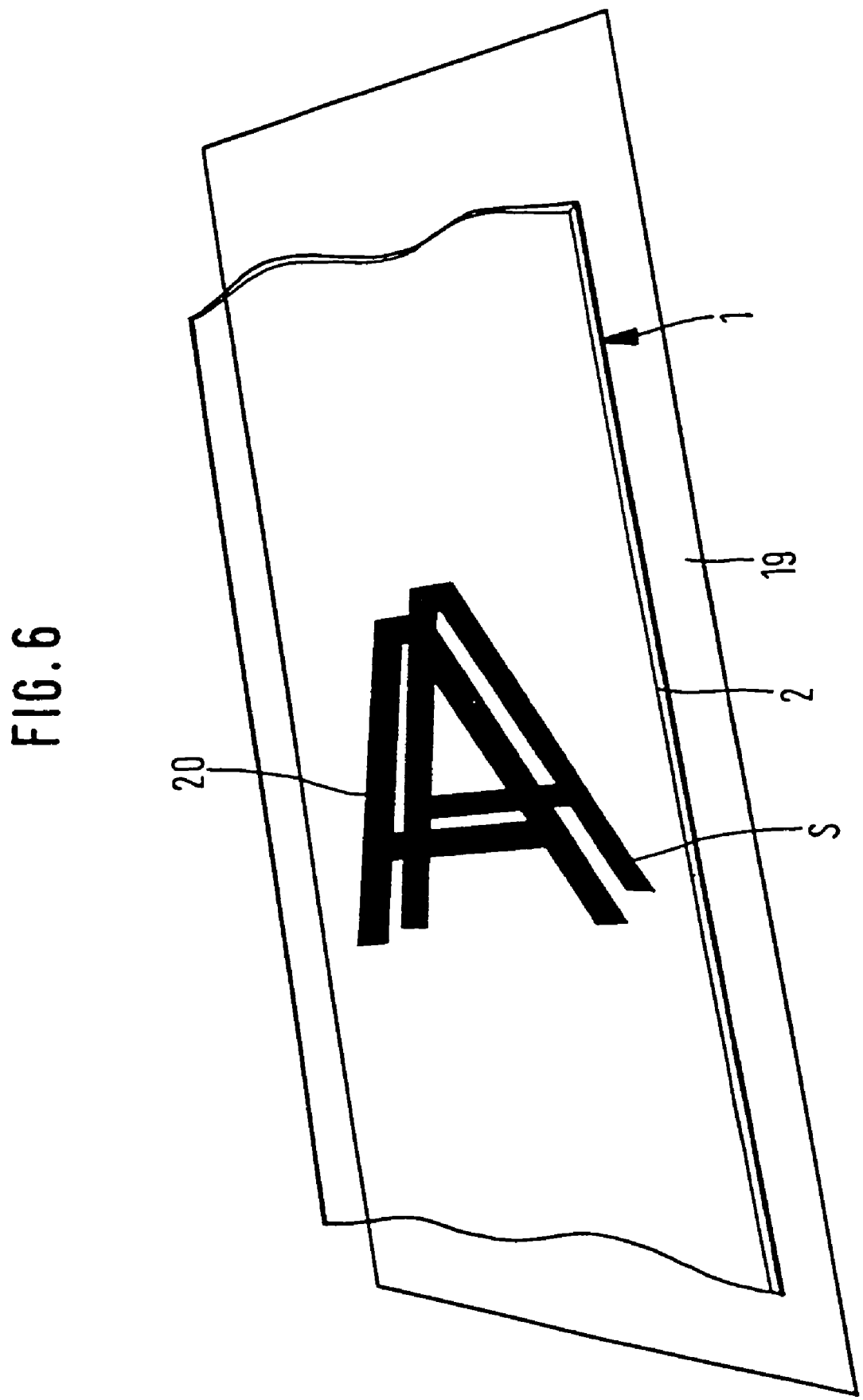

SECURITY DOCUMENT

CROSS-REFERENCE TO RELATED APPLICATION

This application is a National Phase of International Application Ser. No. PCT/EP03/04006, filed Apr. 16, 2003.

FIELD OF THE INVENTION

This invention relates to a security document with a security element, a method for producing such a security document and a test method for testing such a security document.

DESCRIPTION OF THE BACKGROUND ART

The use of security elements for protecting security documents has been known for some time in a great variety of embodiments. The term "security document" refers here to any document that is to be protected against unauthorized attacks in some way. Documents may have to be protected against different attacks depending on the type of document or information carried by the document.

Certain documents must be protected primarily against forgery and/or falsification. Such documents include for example bank notes, shares, papers of value, ID cards, certificates, checks or virtually any other type of official document. With some of these documents, for example bank notes and papers of value, protection against forgery is most important. Forgery refers here to any imitation of the original, no matter by what means this is attained. In contrast, checks and certificates, for example, must be protected primarily against falsification of content, since such documents are normally not forged completely but primarily subject to the danger of content being altered in fraudulent fashion by e.g. forgery of signatures and replacement of names or amounts.

Typical security elements that are incorporated into the security paper on which the particular document is printed or into the print itself for avoiding forgery are for example watermarks, security threads, mottling fibers, holograms or other special printing processes that are difficult to imitate. Security documents, such as bank notes, are normally equipped with a plurality of different security elements that can be tested partly with the naked eye and partly in special test devices by viewing the documents in reflected light, transmitted light or ultraviolet light.

Despite the great number of existing different security elements, there is a continuing need for new, easily checked, safe means of proof that permit the authenticity of a document or the correctness of its entries to be tested.

A second essential security point is protection against unauthorized perusal and/or duplication of information described on the document by unauthorized persons. Corresponding measures are necessary for example in confidential documents of research and development departments, military documents, minutes of discussions to be kept secret, e.g. at diplomatic services, etc. In particular, since the wide spread of commonly available copying machines already found in most offices and the advances in the area of photography, there is an interest in protecting relevant documents against unauthorized photocopying or photography.

There are various known security elements in this area as well. In the first years following development of the photocopier, confidential documents were covered for example with a red, transparent foil or coating that absorbed the light of the black-and-white copying machines, which was usually green, and thus made a copy impossible. Besides the annoyance due to the difficult readability of documents thus protected, there is the disadvantage that documents are only protected against green light. Photographic images or copying with more modern copying machines with white light are nevertheless possible. In other methods, an embossed transparent foil is applied to the document that acts like a set of prisms and diverts the direction of the light. The prisms can be formed so that one cannot look at the document through them perpendicular from above. This makes it very difficult to make a copy. In newer known methods, phototropic substances are used to protect documents. These are chemical compounds whose structures change under the influence of light. They thus assume a different color and can therefore protect documents against copying in principle. However, it is problematic that such phototropic substances often react quite slowly so that the copy is made faster than the changeover of the substances. Another problem is that such substances cannot prevent documents being nevertheless copied with reduced light or by other methods. A further possibility for preventing unauthorized copying is to install devices in the copying machines that recognize security threads, magnetic features or other protective devices in the paper of the original and then block the copying operation. A great disadvantage of such methods, however, is that they require installations in the machines and these installations can be easily bypassed by more or less informed technicians.

A considerable need for novel security elements therefore also still exists in the area of protection against unauthorized reading or copying of security documents.

SUMMARY OF THE INVENTION

It is the problem of the present invention to provide a cost-effective and simple alternative to the abovementioned prior art that allows protection against different possibilities of attack depending on the type of security document.

This problem is solved by a security document according to the invention.

According to the invention a security document is provided with a security element that is produced at least partly of a material that is optically changeable by an electric or magnetic field.

By using a material whose optical properties are modifiable by an electric or magnetic field, the security element can be switched quickly from one optical state to another optical state. There are different concrete possibilities of design for protecting the document against different attacks. This will be explained hereinafter with reference to examples.

Preferably, the optically changeable material includes a plurality of particles that are changeable in their position and/or alignment by the electric or magnetic field. This can be obtained for example by enclosing the particles in microcapsules, the microcapsules being brought into a swollen state by a swelling agent so that the particles are supported movably within the microcapsules.

Such materials have become known for instance under the catchword "rotating balls" or the brand name Gyricon® from XEROX. These particles consist of at least two halves that are differently colored and simultaneously have different electric properties. The particles can be e.g. white and negatively charged on one side, and black and positively charged on the other side. However, any other combination of electric polarity and color is also possible. All elements working on the rotating ball principle can fundamentally also be aligned in a magnetic field if the particles have a magnetic polarity. These particles are embedded in a suitable binder, for example transparent silicone gum. Sheets containing the particles can be produced from the binder. Then a liquid swelling the polymer of the sheet, for example oil or high-boiling solvent, is added. Subsequent swelling has the consequence that the particles are now exposed in a cavity, i.e. in their own microcapsule, which is usually filled with the swelling agent. Alternatively, it is also possible to not form the particles directly into a sheet but provide individual particles with a sheath of polymer or another substance. The technology for this corresponds to that used for producing microcapsules for pressure sensitive paper. When swelling agent is applied to these individual microcapsules the latter also swell and allow the contained particles to move freely. The particles enclosed in the microcapsules can then in turn be applied to a surface with a binder. When the particles freely movable within the microcapsules are exposed to an electric or magnetic field, the particles will align with the field lines. The particles thus rotate and turn one of their sides to the viewer, with a suitable field direction of the particles, so that the viewer sees for example either only the black side or only the white side in the case of a black-and-white colored particle with suitable polarity, and the surface of the material thus appears white or black to him. Instead of a small sphere, any other particle forms can fundamentally also be used, e.g. cylindrical particles.

A special effect can be obtained by using particles having two transparent hemispheres separated by an opaque layer. Such particles can be brought by suitable alignment of the electric or magnetic field into an opaque position in which the opaque separation layer in the individual particles is perpendicular to the viewing direction. A different arrangement of the field can ensure that the particles align rotated by 90° and thus the opaque separation layers in the particles are parallel to the viewer's viewing direction. This causes a layer of material constructed by the particles to be transparent since the viewer can see between the separation layers of the particles as through a slatted curtain whose slats are aligned parallel to the viewer's viewing direction.

In an alternative embodiment, a plurality of colored particles are embedded in individual microcapsules in the manner of a powder, whereby two different kinds of powder particles having different colors and different electric charges are used. An applied electric field then ensures that one kind of particle moves in the field direction and the other kind contrary to the field direction. If several such microcapsules are located side by side in a layer of material, the color of the layer of material can consequently be altered—regarded from a certain viewing direction—by accordingly applying a field. Any combination of particle color and electric polarity can be used here depending on the case of application.

The stated optically changeable materials are bistable, i.e. the particles remain in their position and/or alignment until a new field is applied that aligns them differently or changes their position.

Such materials are finding application in the production of so-called "electronic paper." The material is used here to form thin sheets by the above-described method. Then a system of thin electroconductive paths is applied to the sheet so that an electric field can be locally applied at individual points of the sheet. This permits the individual points of the sheet to be addressed. The individual electrophoretic particles will then align with the field and one of their optical sides turn upward, or the corresponding kind of particle within a microcapsule will move upward toward one electrode and the other kind of particle downward toward the other electrode so that a point with a desired color arises there. This permits visible characters to be evoked on the sheet. In practice these materials are already being used for producing electronic price labels on supermarket shelves.

It has turned out that such rotating-ball particles or colored powder mixtures located in microcapsules are especially suitable for producing novel and readily recognizable security elements. No complicated addressing or other additional extensive measures during production are required. It suffices to apply to the document the optically changeable material with the particles in operable form. Therefore, a security document can be provided with the novel inventive security elements in conventional operations as are usual in printing technology.

For this purpose the individual particles can be used for example simply as pigments of a "printing ink," i.e. an optically changeable material is produced that can be processed like a printing ink. The material can be printed on the document all over in order to produce for example a complete security layer of the material. Alternatively, any information, for example a text, symbol, logo, etc., can also be produced on the document by the material. The carrier material used here may be the customary paper used for the particular document. The optically changeable material can be applied precisely like any other printing ink by screen printing, intaglio printing, line intaglio printing or any other expedient method.

According to a first preferred example, the security layer and/or information could be produced on the security document here by an already activated optically changeable material, i.e. the information or security layer is printed using particles already sheathed in microcapsules. The microcapsules already contain the swelling agent in which the particles move. After printing and drying of the material, an operable security feature arises directly.

In an alternative preferred example, the security layer and/or information is first produced on the security document by a nonactivated optically changeable material and the security document is then treated with a swelling agent to activate the optically changeable material. That is, first only a "printing ink" containing the particles in their microcapsules in unswollen form is used. After printing and after drying of the print, the individual particles are firmly bound in the ink in immovable fixation and random alignment. Then the swelling liquid, e.g. an oil, silicone oil preparation, high-boiling solvent or other suitable liquid, is applied to the document. This swelling agent penetrates into the ink and makes it swell. This causes the spaces to form around the particles in which the particles are now immovable. The security element is then operable and can be excited by electric or magnetic fields.

In a further preferred variant, not only particles in microcapsules are added to the printing ink but additionally the swelling agent in microencapsulated form. After drying of the material on the document, destruction of the microcapsules can be obtained for example by mechanical pressure. This releases the swelling agent to act on the microcapsules of the movable particles as described. Microencapsulated swelling agents such as high-boiling solvents are known from the production of pressure sensitive paper.

In the same way, microcapsules with movable particles—optionally with microcapsules with swelling agent—can be incorporated not only in printing ink but also in writing inks or other coloring agents, which are then applied to the document as described above. Realizations are likewise possible for producing ink-jet inks, toners for copiers, laser printers, etc.

As mentioned above, it is not necessary to apply addressing lines to the document for protecting a document by the inventive security elements. A test can be effected by bringing the security document into an external electric field. If for example a printed image consisting of the inventive material has been applied to the document, it can be switched to one of two positions simply by suitably applying the electric field, so that the applied character becomes visible in a certain color. When the field direction is changed, the color of the character also changes. The same result can be obtained by simply inverting the document in the field.

Corresponding test devices with electric fields are cost-effective and easy to produce. The use of the security element is thus in particular also suitable for mass-produced security documents such as bank notes, since the security element on the bank note can be checked by a cost-effective device at any place of payment such as a department-store or supermarket cash register, gas station, etc.

In an additional variant, a printed security element can be influenced by a time-variant electric or magnetic field. This causes for example printed information to alternately appear and disappear or to move within the area. Here, too, it is possible to change the form of appearance of the character solely by moving the document within the electric field.

In a further preferred example, the security document is equipped with an at least partly electrically conductive layer for applying an electric field and/or shielding an electric field. Combinations of different electrically conductive layers are possible here, whereby the electrically conductive layers can also be structured.

In an especially preferred variant, at least two conductive layers are electrically connected by a preferably microelectric circuit. This circuit preferably includes a switchover unit formed so as to switch a conductive connection to a nonconductive state or vice-versa only after receiving a security code, for example a password.

The use of such electrically conductive layers or combinations of connected electrically conductive layers provides a further plurality of possibilities of varying the concrete design of the security elements.

Additional variations can be achieved by constructing the material so that it is brought into a state in which it is optically changeable by an electric field only by irradiation of light. For example, the particles of optically changeable material can be adapted to be brought into the state in which they are changeable in their position and/or alignment by the electric field by irradiation of light, i.e. particles are used for example that develop an electric polarity only in light. It is expedient to use particles having a photoelectrically reacting side. Such particles will be aligned in an electric field only when light simultaneously falls on the surface.

Alternatively, the particles of optically changeable material can be embedded in a substance that produces an electric field upon irradiation of light. For example, the binder can be mixed with photoelectric polymers that develop an electric charge upon exposure to light. Likewise, a further layer producing an electric field upon irradiation of light can be applied to the security document.

If the security element is used for preventing forgery or falsification of the document, it is expedient to use an optically changeable material that is soluble by organic media and/or water. Manipulation of the security document with chemicals and/or water then leads to damage of the security element so that the manipulation is noticed at a later check.

Since the diverse variants of layers and/or information consisting of optically changeable material, of electrically conductive layers and of photoelectric materials can be used in any combinations, there is a virtually unlimited number of variations for creating a concrete security element by the inventive method. The security element can therefore be optimally adapted in its properties to the particular purpose of protection.

For producing forgery-proof documents or documents that are difficult to forge, in particular the following variants are expedient.

In one variant, the side of the rotating-ball particles of inventive material that is visible in the normal state and the surrounding printing ink or a background color have a similar or even identical color. The security element is then not easily noticed. The particles flip to their other state only by application of the electric field, and the security element is then switched to a different—preferably contrasting—color so that a distinctly perceptible change in the image appears. Different effects can be obtained by suitably selecting the particular colors on the two halves of the particles. If e.g. a fluorescent substance and a nonfluorescent material are used for the two halves of a particle, the printed information or layer can be visible only in UV light in a first orientation, but be visible in normal light in a second alignment. Likewise, only differently fluorescing or nonfluorescing sides yield an interesting effect only recognizable under UV light. The same effects can be produced by corresponding colored powder particles in a microcapsule.

Different variations result from using a material that can be switched from a transparent to an opaque state. The use of particles with transparent hemispheres and an opaque intermediate layer thus permits the intermediate layer to be of reflecting design, for example, so that in one form of alignment a reflecting surface arises and when an electric field is applied in another direction a printed image located under the layer appears.

Interesting variants can also be produced by printing a little structured or unstructured coating of optically changeable material with electrically conductive, transparent material or with conductive ink, said electrically conductive layer being structured. This permits an external electric field that is basically not or little structured to be modified in its effect by the conductive overprinting. Structures or characters can thus be formed in the field that are not found in the coating with optically changeable material. Further, it is possible to produce such characters by using structured electrodes in the testers. For example, a certain character could be printed on one plane of a security document and this printed image then overprinted with a security layer of inventive material that can be switched from an opaque to a transparent state. When the security document is later placed in a test device that produces a structured electric field precisely at one place, the security layer is switched from the opaque to the transparent state only in this area, so that it can be tested if the electrode structures are covered with the printed image located under the security layer.

In one example, a transparent, structured, conductive overprint is connected with an all-over conductive layer on the back of the document. An external field is shorted between the layers and no change in an image appears there, whereas a different optical impression is obtained by the electric field with corresponding positioning of the optically changeable material all around. Any other realizations with the aid of electrically conductive printed layers are equally possible.

Especially interesting embodiments result from combining the inventive method with other known protecting means. For example, holographic elements on bank notes frequently consist of an embossed synthetic resin backed with metallic layers. Such elements can be additionally enhanced by a print or frame with inventive layers. If security threads are used, they can be transparent or else metalized. Printing on an inventive material with sufficiently fine particles permits characters that can be switched visible or invisible depending on the alignment of the electric field to be applied to the security threads. Likewise, a security thread itself, for example, can be switched translucent or opaque if it is produced from the optically changeable material.

For protection against falsification of content of a security document, in particular one variant is expedient in which information to be protected is applied to an inventive security layer. The inventive security layer can thus be applied e.g. in a part of the surface of a check, preferably in the amount field, or in the area of the first signature in the case of traveler's checks. The color of this area can be different from the color of the surrounding check. But it is preferably very similar or identical, so that the inventive coating is not noticed. The information to be applied in this area, i.e. the signature or amount, is then written or printed over the security layer. If a forger attempts to remove by erasure a character present in the original, he will thus remove part of the security coating at the same time. If the background color matches that of the security layer or the security layer is transparent, he will not notice it. When the security document is brought into an electric or magnetic field for testing, however, the erased part will be immediately noticed. For example, the particles in the security layer could switch from their invisible to a black form so that the erased part is immediately recognizable as light tracks in otherwise black surroundings.

When a soluble binder is used for producing the inventive material, the same applies to removal of the print by chemical methods. Upon testing in an electric field, traces of wiping are then recognizable, whereby portions of the inventive material have normally also been blurred in the surrounding area on the document.

For protecting a security document with secret information against unauthorized reading or copying, especially the following variants are expedient.

In a first variant, the document to be protected or at least the areas containing the information to be protected are covered with a security layer that can be switched from a transparent to an opaque state by the electric field. When the security layer is switched to the opaque orientation by applying a suitable field, the information on the document is no longer visible. When the document is to be used, it must first be switched back to its visible state in an electric or magnetic field.

In a second variant, the information is executed on the security document directly in an ink or toner consisting of the optically changeable material. The ink or toner contains as pigments the particles changeable in their position and/or alignment by an electric field. The abovementioned black-and-white particles can be used here for example. If a document is prepared in this way with such an ink or toner on white background paper, the information is invisible in a state in which all particles are so aligned that their white side is directed away from the paper, i.e. upward. When the document is brought into a suitable electric field, however, the particles switch and the information presents itself black on a white background. This embodiment offers special advantages if multicolor documents must be prepared. Such documents can be prepared by using writing inks, printing inks or toner that have differently colored particles in each case. The switch to the visible or invisible state can be performed simultaneously for all particles.

Further, additional protection can be obtained in such documents by using electroconductive, transparent layers that cover the document in each case. A microelectric circuit interconnecting the two layers can be incorporated in the carrier material. If an electric field is applied from outside with an intent to make the document visible, the applied field does not affect the inventive material located in the field-free space between the electrically conductive layers, due to the layers connected by the circuit. Therefore, it is impossible to switch the security document to its readable state. If the circuit is simultaneously damaged and brought into a permanently conductive state by such an unsuitable attempt, the document cannot be read at all any more.

The circuit can be so formed that it must be first addressed by a code or password and only then interrupts the conductive connection of the two sides. Then a suitable electric field can be applied to the document via the electrically conductive layers for example by contacting said electrically conductive layers with a voltage source. The information is thus switched visible again. After use, the security document can be switched to the invisible state in the same way by polarity reversal of the field and the conductive connection restored between the two electrically conductive layers of the document.

For protection against unauthorized copying it is also expedient to use additional materials, for example as binder in the inventive material or as additional layers that build up electric fields when irradiated with light. The electrically polarized particles will then align with the field produced by the photoelectric charge. By suitable execution of the polarity of the particles in the optically changeable material, the color design and the photoelectric properties of the additional material, the material can be caused to switch to an invisible state as desired when a maximum allowed brightness is exceeded.

BRIEF DESCRIPTION OF THE DRAWINGS

The invention will be explained in detail hereinafter on the basis of examples with reference to the enclosed figures, in which:

FIG. 5 shows a schematic partial cross section through a security document according to a third example, FIG. 6 shows a perspective plan view of a security document according to a fourth example in a structured electric test field.

DETAILED DESCRIPTION OF THE INVENTION

Figure 1:
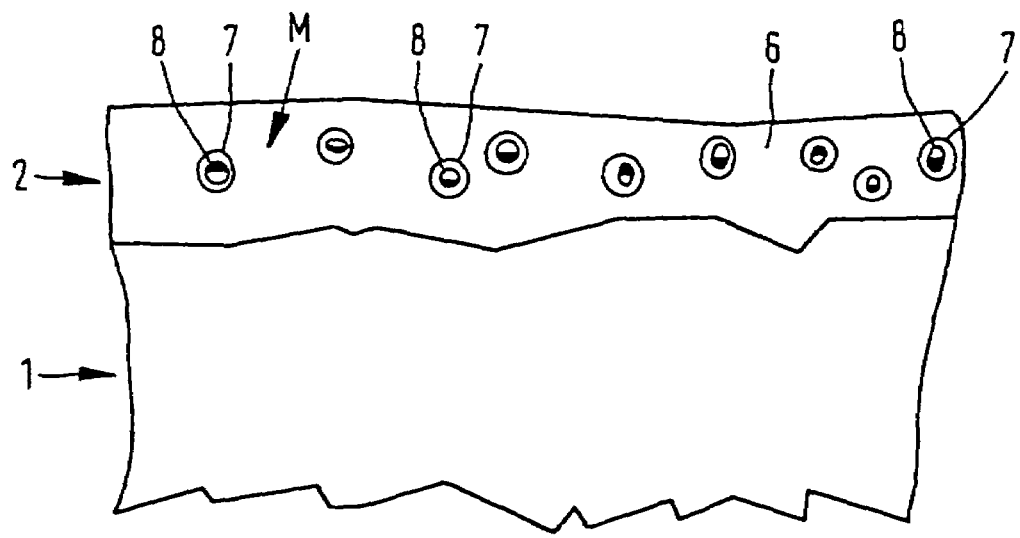
FIG. 1 shows a schematic partial cross section through an inventive security document according to a first example before being brought into an electric field.

FIG. 1 shows the surface of security document 1 on which security layer 2 of inventive material M was produced by a printing operation. This may be for example unstructured security layer 2 completely covering the surface of security document 1.

Material M contains here in binder 6 a plurality of microcapsules 7 in which individual particles 8 are freely movable floating in a swelling agent. "Pigment particles" 8 are electrically polar and have a black side and a white side. In the initial state, without a defined electric field previously acting on the particles, particles 8 are aligned randomly.

Figure 2:
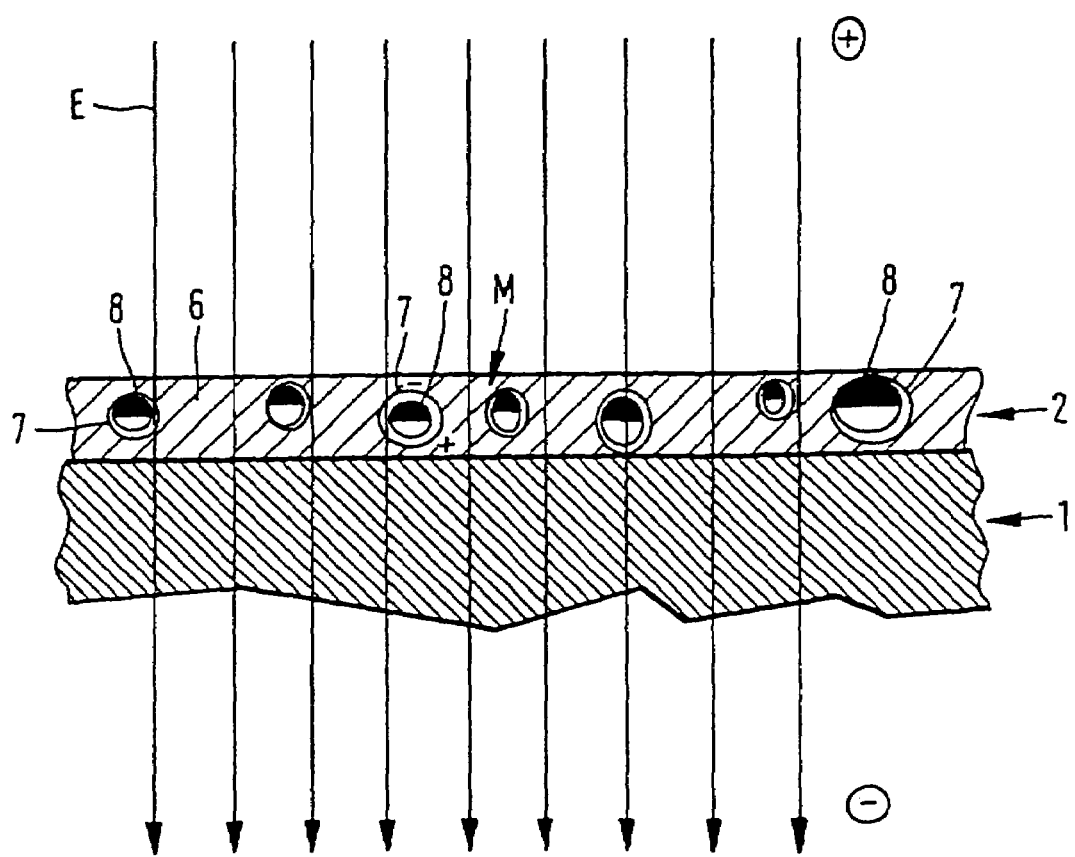
FIG. 2 shows a schematic partial cross section through an inventive security document according to the first example but in an electric field.

FIG. 2 shows the effect that occurs when this security document is brought into electric field E. It is assumed here that the black half of particles 8 is negatively charged and the white half positively charged. Electrophoretic particles 8 floating freely movably in individual microcapsules 7 will then align with applied electric field E in accordance with their polarity. In FIG. 2 the field is so applied that particles 8 all point upward with their black half so that material M, i.e. security layer 2, appears altogether black when regarded from above.

It is to be heeded that for clarity's sake the figures show microcapsules 7 with particles rather isolated in security layer 2. In reality, particles 8 or microcapsules 7 are packed relatively densely within binder 6. Likewise, for the sake of better representability the individual layers are not shown in the correct ratios of size.

On white background paper, security layer 2 would be clearly recognizable as an all-over black color of the paper. When the electric field is reversed, the white halves of particles 8 turn upward and security layer 2 becomes virtually invisible. If a structured security layer or information is printed on with inventive material M instead of all-over security layer 2, the electric field can cause the structure or information to switch back and forth between a visible and an invisible state.

Figure 3:
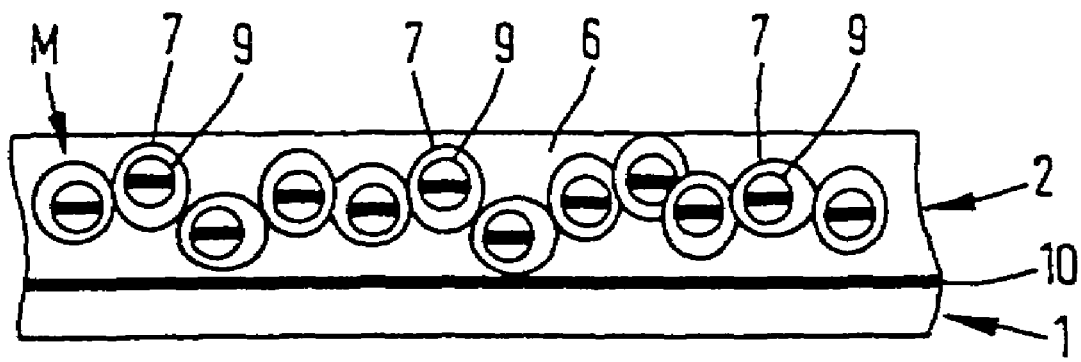
FIG. 3 shows a schematic partial cross section through a security document according to a second example in a first state.
Figure 4:
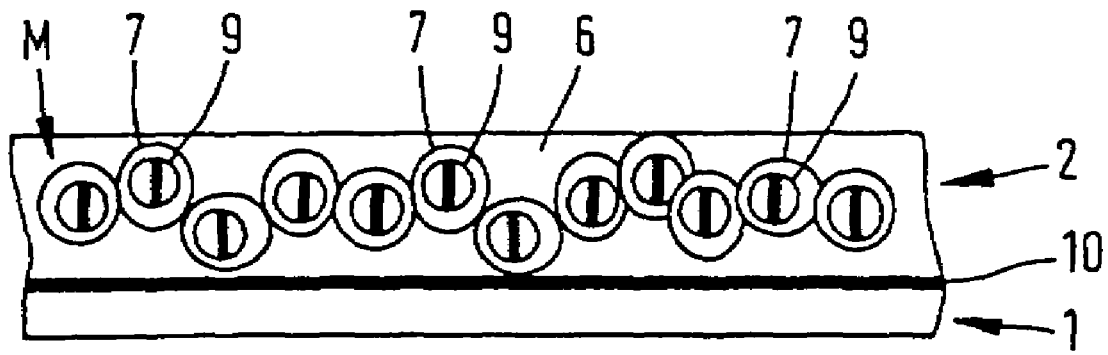
FIG. 4 shows the security document according to FIG. 3 in a second state.

FIGS. 3 and 4 show a further variant. The essential difference over the examples according to FIGS. 1 and 2 is that individual particles 9 have two halves of transparent material that are separated by an opaque middle layer. When aligned according to FIG. 3, security layer 2 is thus opaque. Print 10 with certain information applied to document 1 under security layer 2 is then invisible.

FIG. 4 shows the position of particles 8 in case of a field rotated 90°. Here the opaque separation layers within particles 8 are perpendicular to the surface of document 1 so that one can see through security layer 2 from above and the information in printed layer 10 becomes recognizable.

The example according to FIG. 5 involves a variation of somewhat more complicated construction in which certain information was applied to document 1 with inventive optically changeable material M. FIG. 5 shows a section through a printed letter in a greatly enlarged representation.

Specifically, background layer 18, for example a black or dark-gray background, is printed on the basic material of document 1 here. Thereabove is layer 4 that is produced of optically changeable material M in the area of the letters to represent information 3, and of further material 5, for example conventional printing ink 5, in edge areas. Material M again has particles 8 embedded in microcapsules 7 in binder 6 as shown in FIGS. 1 and 2. Particles 8 consist here of a white half and a dark colored half. The dark color of particles 8 corresponds precisely to the color of colored material 5 surrounding information 3. Background layer 18 also has this color.

In the state shown in FIG. 5 a viewer looking at document 1 from above will therefore no longer be able to recognize information 3 applied in layer 4 in surrounding material 5 by material M. By applying a suitably electrically oriented field, particles 8 can be rotated so that information 3 appears white on a dark background and in dark surroundings.

To prevent information 3 on security document 1 from being made visible at will by applying an external electric field, security document 1 is coated on each side with layer 11, 12 of transparent conductive material, for example a conductive polymer or the like. Layers 11, 12 are shorted via lines 14, 15 and microelectric circuit 13, which is provided for example in the paper of document 1. On the back of document 1, i.e. on lower electric layer 11, there are contact areas 17 likewise connected via line 16 with microcircuit 13. By inputting an electronic code via contacts 17 to microcircuit 13 the short between electrically conductive layers 11, 12 can be eliminated. It is then possible to apply a voltage to layers 11, 12 and thus produce a suitable electric field, thereby rotating particles 8 within material M and making information 3 visible. By polarity reversal of the electric field, i.e. by reversing the voltage on layers 11, 12, particles 8 are switched back to the state shown in FIG. 5. By inputting a further code it can be ensured that microcircuit 13 shorts the two electrically conductive layers again. This again prevents the security document from being made readable in unauthorized fashion by applying voltage to conductive layers 11, 12, i.e. document 1 is protected again.

FIG. 6 shows an example in which security document 1 is coated with large-surface security layer 2. In the test device an external structured field is applied in which structured metallic electrode 20 is used on the upper side and all-over counterelectrode 19 on the underside. In unstructured layer 2 on the security document, precisely structure S of structured electrode 20 is then imaged.

The examples described in the figures are fundamentally also possible for particles with magnetic polarity that can be aligned in a magnetic field.

The invention claimed is:

1. A method for producing a security document (1) with a security element (2, 3), the security element (2, 3) being produced using a material (M) that is optically changeable by an electric field (E) or magnetic field, the optically changeable material (M) including a plurality of particles (8, 9) that are changeable in at least one of their position or alignment by means of an electric field (E) or magnetic field, the optically changeable material (M) being produced by enclosing the particles (8, 9) in microcapsules (7) and incorporating them in a binder (6), characterized in that for activating the optically changeable material (M) the microcapsules (7) are brought by a swelling agent into a swollen state in which the particles (8, 9) are supported movably in the microcapsules (7), the optically changeable material (M) being applied to the security document (1) in a nonactivated state.

2. A method according to claim 1, characterized in that for producing the optically changeable material (M) the particles (8, 9) are incorporated in an ink or toner as pigments.

3. A method according to claim 1, characterized in that the security element (3) applied to the security document (1) using the optically changeable material (M) is information (3).

4. A method according to claim 1, characterized in that the security element (2) applied to the security document (1) using the optically changeable material (M) is a security layer (2)

5. A method according to claim 1, characterized in that at least one of the security layer or information is produced on the security document by means of a nonactivated optically changeable material, and the security document is treated with a swelling agent to activate the optically changeable material.

6. A method according to claim 1, characterized in that at least one of the security layer or information is produced on the security document by means of a material including the nonactivated optically changeable material and microcapsules containing the swelling agent required for activation, and activation of the optically changeable material on the document is effected by destroying the microcapsules with the swelling agent.

* * * * *